United States Patent [19]

Gaither

[11] Patent Number: 4,550,553
[45] Date of Patent: Nov. 5, 1985

[54] PLASTIC SHEET TUBING, BAG-FORMING APPARATUS FOR LAWN MOWERS

[75] Inventor: John L. Gaither, Louisville, Ky.
[73] Assignee: Richard L. Caslin, Louisville, Ky.
[21] Appl. No.: 543,615
[22] Filed: Oct. 20, 1983
[51] Int. Cl.[4] .............................................. A01D 53/06
[52] U.S. Cl. ..................................... 56/202; 56/16.6; 53/583; 53/552
[58] Field of Search ................ 53/548, 549, 550, 551, 53/552, 528, 583, 135, 485, 567, 576, 577; 56/202, 16.6

[56] References Cited

U.S. PATENT DOCUMENTS

| | | | |
|---|---|---|---|
| 3,143,842 | 8/1964 | Mattson et al. | 56/202 |
| 3,624,989 | 12/1971 | Gatheridge | 56/202 |
| 3,974,631 | 8/1976 | Rhodes | 56/202 |
| 4,044,525 | 8/1977 | Forsgen | 53/435 |
| 4,107,903 | 8/1978 | Wickersheim | 53/583 |
| 4,223,508 | 9/1980 | Wells | 53/552 |
| 4,242,171 | 12/1980 | Kauer et al. | 53/583 |
| 4,446,677 | 5/1984 | Kokido | 53/552 |

Primary Examiner—Robert P. Swiatek
Assistant Examiner—David I. Tarnoff
Attorney, Agent, or Firm—Richard L. Caslin

[57] ABSTRACT

Apparatus is mounted on the rear of a riding lawn mower for utilizing a large supply of large size plastic sheet tubing to form plastic bags as needed for receiving the grass cuttings being discharged from the lawn mower, so that the mower operator need not leave his seat on the lawn mower in order to seal the plastic bag after it is full of cuttings, and to discharge the bag away from the lawn mower. This apparatus is vertically mounted. The grass cuttings are blown to the top of the apparatus into a first air-release funnel. Beneath this funnel is a supply of large plastic sheet tubing folded lengthwise into an annular cartridge. A throttle section is positioned beneath the cartridge for collapsing the sheet tubing into a rope-like formation. Then a pair of vertically-spaced sealing tape dispensers serve to seal the rope-like formation at two locations. Then a cutter severs the plastic to complete sealing the top of a filled bag and for sealing the bottom of the next plastic bag to be filled. A bag support platform is positioned at the bottom of the apparatus for supporting the plastic bag as it is being filled.

25 Claims, 15 Drawing Figures

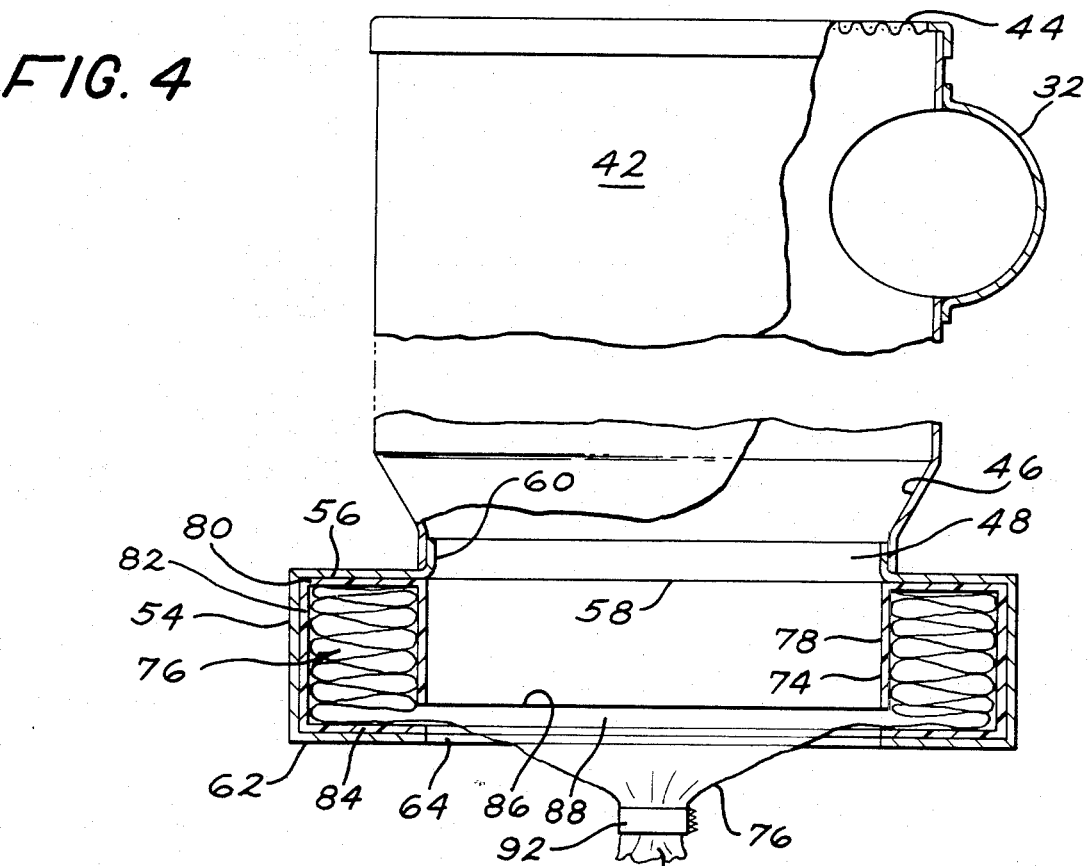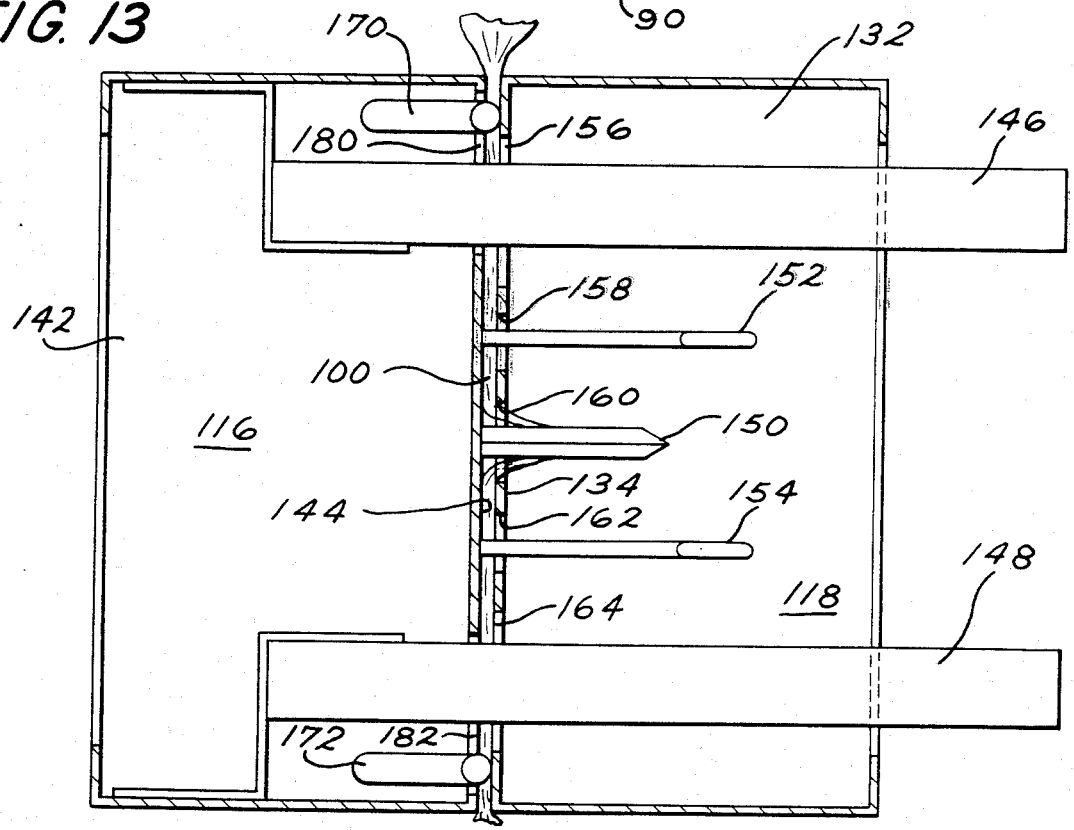

PLASTIC SHEET TUBING, BAG-FORMING APPARATUS FOR LAWN MOWERS

BACKGROUND OF THE INVENTION

1. Field of the Invention

This invention relates to the art of grass catchers for use with power lawn mowers and particularly for riding, self-propelled lawn mowers which have a bag forming system for collecting the grass clippings, and then sealing the bag and discharging the bag from the lawn mower, for repeating the cycle.

2. Descriptions of the Prior Art

A primitive patent issued in 1894 is the Storey U.S. Pat. No. 515,802 which shows a farm implement by way of a mowing machine having attachments for collecting the clippings of clover or short grasses as the cutter bar passes over the growth. These clippings are passed back to a suitable receiver from which they may be discharged from time-to-time at the will of the operator.

The Van Der Gaast U.S. Pat. No. 3,816,986 describes a push mower or a self-propelled mower for a walking operator, where there is a grass catcher hopper provided with a plurality of perforations and a swinging door which opens to discharge the catchings when an operating lever is manually operated. A second modification is shown with a riding mower having a grass catcher hopper with a rear door as well as a bottom door.

The Rhodes U.S. Pat. No. 3,974,631 shows a riding lawn mower having a chute for blowing the grass clippings back into a grass catcher assembly that is suspended from the rear of the mower. Plastic bags are located in two separate containers. The entire containers pivot to discharge the sealed plastic bags once they are filled.

The Myers U.S. Pat. No. 3,736,736 describes a riding lawn mower having an attachment on one side for baling the grass clippings in a tubular plastic bag forming system. There is provided an annular cartridge or reel of polyethylene which is a wound tubing known as "radially wound" tubing. This tubing is used in conjunction with a tubular auger housing which provides a positive loading action of the grass clippings into the box-like enclosure or housing for receiving the grass clippings. The plastic tubing is manually loaded within the enclosure. A stapler mechanism is furnished for stapling the end of the plastic tubing closed or sealed. The auger serves to fill the tubing with the grass clippings. Then the operator leaves the mower and seals the other end of the tubing and then the tubing is cut to permit removal of the filled plastic bag. A real problem exists with this Myers design if the auger is allowed to overfill the plastic tubing so that the bag cannot be closed and sealed.

The Jackson U.S. Pat. No. 3,716,977 describes a riding lawn mower that includes a grass catcher assembly supported from the rear thereof. A rectangular subframe has a plastic bag suspended therefrom so that the grass clippings may be blown into the bag. The subframe with the plastic bag attached is releasably retained in the main frame by means of a pivoted stop which may be moved to release the subframe and permit it, together with the filled bag, to be slid in a horizontal plane out of the main frame for discharging the contents of the bag.

The last patent is the Leighton et al U.S. Pat. No. 2,916,863 which describes an early plastic bag taping or sealing machine using self-adhesive tape which can be tightly wrapped around the end of the bag once the end has been twisted into a tight rope-like configuration.

OBJECTS OF THE PRESENT INVENTION

The principal object of the present invention is to provide a riding lawn mower with an apparatus for forming plastic bags for receiving the grass cuttings by using a supply of large plastic sheet tubing that is folded lengthwise into an annular cartridge, and automatic means for sealing the top open end of a filled bag at the same time as sealing the lower end of the next bag to be formed, filled, sealed and discharged.

A further object of the present invention is to provide a plastic tube bag-forming apparatus for mounting on the rear of a riding lawn mower and having an air-release funnel section at the top of the apparatus which separates the high velocity air from the grass cuttings so that the cuttings may fall by gravity into the plastic tube that is formed as a bag for receiving the cuttings.

A further object of the present invention is to provide a bag-forming apparatus of the class described that incorporates a supply of large plastic sheet tubing that is folded lengthwise into an annular cartridge that is positioned below the discharge opening of the funnel section.

A further object of the present invention is to provide a bag-forming apparatus of the class described with a throttle section positioned beneath the cartridge of plastic sheet tubing which incorporates a pair of track-mounted carriages that are capable of collapsing the top of the plastic bag into a rope-like formation in preparation for applying sealing means at two vertically spaced positions.

A further object of the present invention is to provide a bag-forming apparatus of the class described that is adapted to be mounted on the rear of a riding lawn mower, where the operator need not dismount from the lawn mower in order to operate this bag loading, sealing and discharging system.

A still further object of the present invention is to provide bag-forming apparatus of the class described with a movable bag-supporting platform that is capable of rising to accommodate sloping terrain to protect the platform from damage.

SUMMARY OF THE INVENTION

The present invention provides an auxiliary frame that is adapted to be supported from the rear of a riding lawn mower. This auxiliary frame has a series of vertically-arranged elements starting with an air-release funnel section at the top of the frame, a supply of large plastic sheet tubing folded into an annular cartridge that is arranged beneath the discharge bottom opening of the funnel section. A throttle section is positioned beneath the annular cartridge, and it has means for collapsing the top of the large plastic bag into a rope-like formation. Sealing means are also provided for sealing the plastic rope-like formation at two vertically-spaced locations. Cutter means are also provided between the two sealing means for severing the rope-like formation. A bag support platform is positioned at the bottom of the auxiliary frame for supporting the weight of the bag as it is being filled.

BRIEF DESCRIPTION OF THE DRAWINGS

This invention will be better understood from the following description taken in conjunction with the accompanying drawings, and its scope will be pointed out in the appended claims.

FIG. 4 is a fragmentary rear elevational view, on an enlarged scale, with parts broken away and others in cross section, as well as showing a supply of large plastic sheet tubing that is folded lengthwise into an annular cartridge that is arranged horizontally beneath the discharge opening of the funnel section. Notice the plastic sheet tubing has been pulled out of the cartridge, and the free end of the tubing has been sealed to form the closed bottom of a plastic bag that is to be filled.

FIG. 13 is a fragmentary, cross-sectional, elevational view on an enlarged scale, taken on the line 13—13 of FIG. 12, showing the two track-mounted carriages in their final closed position with the rope-like formation of the plastic sheet tubing sandwiched therebetween, and particularly showing how the cutter blade has severed the plastic.

DESCRIPTION OF THE PREFERRED EMBODIMENTS

Figure 1:
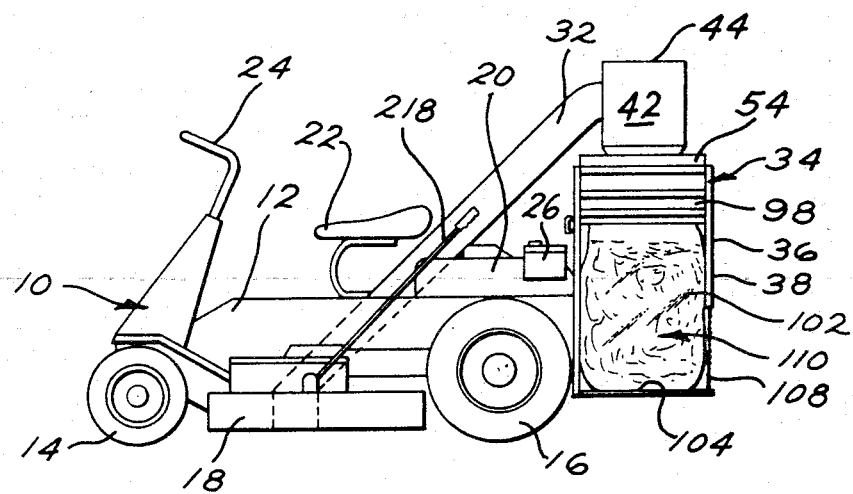
FIG. 1 is a left side elevational view of a riding lawn mower which is furnished with a plastic sheet tubing, bag-forming apparatus embodying the present invention, mounted on the rear of the lawn mower.

Turning now to a consideration of the drawings, and, in particular, to the left side elevational view of FIG. 1, there is shown a standard riding lawn mower 10 having a chassis 12, a pair of front wheels 14, and a pair of rear wheels 16, and a mower housing 18 mounted on the underside of the chassis between the front and rear wheels. There is a rear-mounted engine 20 that provides the propulsion power for the mower as well as the power for driving the mower blade (not shown) within the mower housing 18. A seat 22 is provided on the chassis for accommodating the operator of the mower. Located in front of this seat 22 is the steering wheel 24 for controlling the direction of movement of the mower. Element 26 is a small gasoline tank which contains the fuel for the engine 20.

On the right side of the mower 10 is a large diameter, upwardly-inclined chute 32 for lifting the grass cuttings that are discharged from the mower housing 18 up to the top of the plastic sheet tubing, bag-forming apparatus 34 of the present invention which is mounted at the rear of the mower 10. The main element of this bag-forming apparatus 34 is an auxiliary frame 36 formed of hollow steel tubing 38 into a box-like housing of open construction. The length of the auxiliary frame 36 from front to back can be seen in FIG. 1, while the width of the auxiliary frame can be understood from the rear view of FIG. 2.

A prominent feature of this bag-forming apparatus is an air-release funnel section 42 which is supported at the top of the auxiliary frame 36. The upper end of the delivery chute 32 is connected tangentially into the side of this funnel section 42 so that the grass cuttings spin within the funnel section 42 in a whirlwind configuration, as is clear in FIG. 4. The top wall 44 of the funnel is formed of wire screen to allow the high velocity air to escape so that the grass cuttings will slow down and fall by gravity toward the bottom of the funnel. A lower wall 46 of the funnel is tapered inwardly to form a smaller diameter discharge opening 48. The best overall view of this air-release funnel section 42 is shown in the perspective view of FIG. 6.

Turning back to a consideration of FIG. 4, it should be remembered that this is a rear elevational view of a funnel section 42. Positioned beneath the lower discharge opening 48 of this funnel is a sheet metal housing 54 which has a top wall 56 provided with a central, circular opening 58, where this opening is provided with a vertical, peripheral flange 60 which telescopes up into the lower discharge opening 48 of the funnel section 42. This vertical flange 60 is fastened to the walls forming the lower discharge opening 48, by means not shown. This sheet metal housing 54 has a bottom wall 62 with a central, circular opening 64 that is generally in alignment with the circular opening 58 in the top wall 56.

Now turning back to FIG. 6, this sheet metal housing 54 is shown in a perspective view and the rear wall is provided with a large, flat-rectangular opening 68, for reasons which will be clear from a description of FIG. 4. Inserted through this rear opening 68 into the hollow housing 54 is an annular cardboard cartridge 74 for holding a large supply of large plastic sheet tubing 76, where such sheet tubing is preferably of transparent or perhaps translucent material so that the operator can view within the bag and determine accurately when the grass cuttings are approaching completely filling the plastic bag. This large plastic sheet tubing 76 is of very thin material similar to that of plastic bags that can be purchased in grocery stores today for use as leaf or trash bags or for filling the standard size trash cans that people use with mating lids (not shown) for storing refuse and waste for later pickup and incineration or burial. Such plastic sheet tubing 76 may have a diameter between about 18 and 24 inches, but the exact size is not critical to the practice of the present invention. This plastic sheet tubing 76 is folded in an accordian fashion into the annular cardboard cartridge 74 in a very compact manner so that anywhere between 100 and 200 feet of plastic sheet tubing can be stored within the cartridge without any difficulty. It should be understood, however, that the exact amount of plastic sheet tubing 76 carried by this cartridge 74 may vary from one manufacturer to the next, and is more a matter of preference than necessity.

The annular cartridge 74 is formed of cardboard or similar low-cost material so that it can be disposable when it becomes empty. The overall size of the cartridge 74 is slightly smaller in size than the hollow interior of the sheet metal housing 54 so that the cartridge generally fills the housing when the cartridge is loaded therein. This cartridge 74 has a central vertical cylindrical core 78 which is suspended from the top wall 80 of the cartridge. The cartridge has four vertical side walls 82 and a bottom wall 84 which is similar in configuration to the top wall 80 except that this bottom wall 84 is slit so that the bottom wall may be folded outwardly when the cartridge 74 is free of the housing 54 for gaining access to the interior of the cartridge for loading the plastic sheet tubing 76 therein at the factory. Notice carefully that the bottom edge 86 of the vertical cylindrical core 78 stops short of the bottom wall 84 so that an annular slot 88 is formed between the core 78 and the bottom wall 84 so that the plastic sheet tubing 76 can be fed from the cartridge through this annular slot. Notice in FIG. 4 that the transparent plastic sheet tubing 76 has been pulled slightly from the cartridge 74 and that the free end of the plastic sheet tubing has been gathered together as at 90 and sealed closed by a self-adhesive tape 62.

Figure 5:
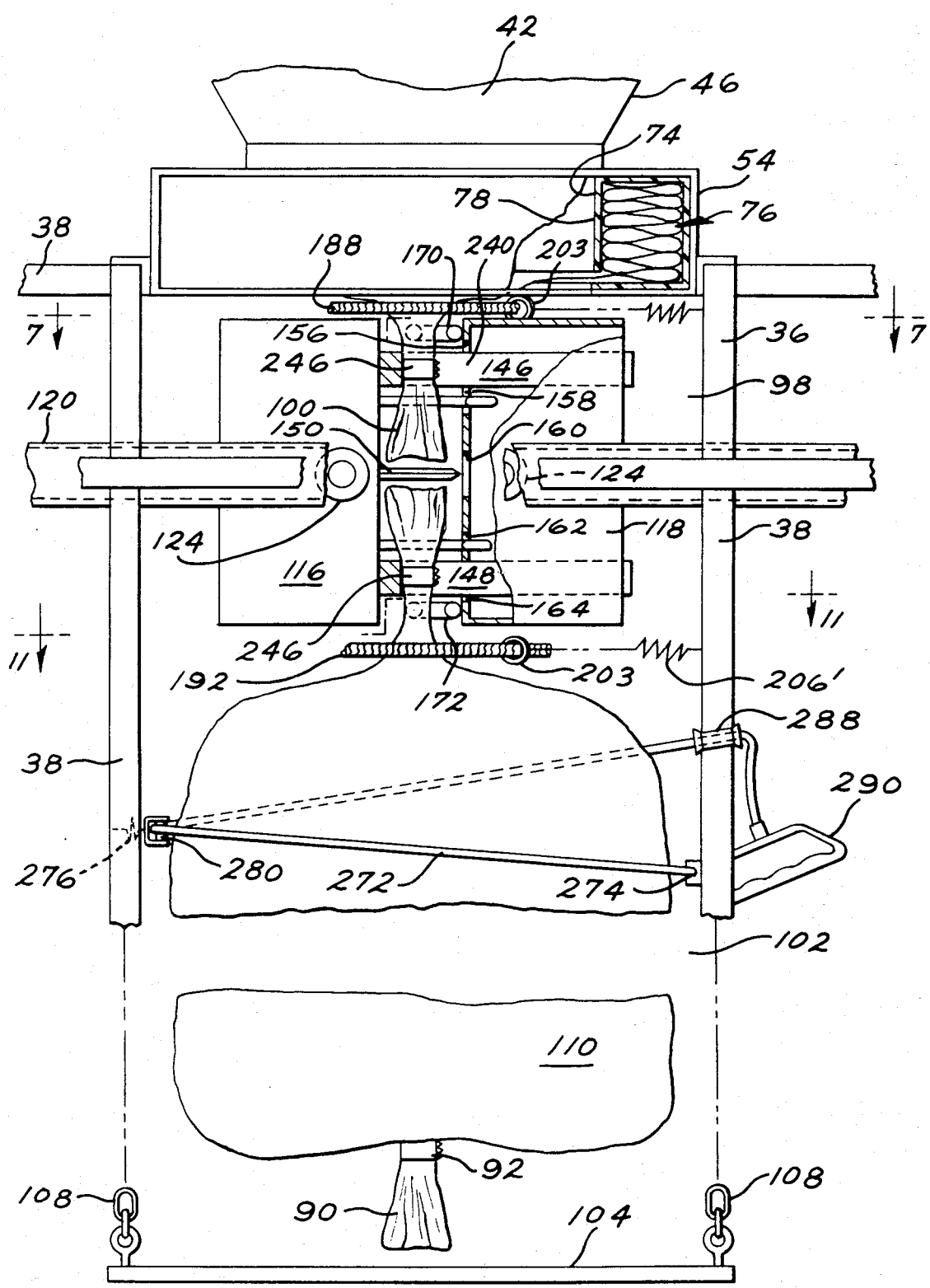
FIG. 5 is a fragmentary rear elevational view of the bag-forming apparatus of the present invention showing the vertical array of the main components of this apparatus with the air-release funnel section at the top, the annular cartridge of plastic sheet tubing beneath the funnel, the throttle section positioned beneath the cartridge for collapsing the empty top of the large plastic bag into a rope-like formation, and a pair of track-mounted carriages for use in this collapsing process, and a plastic bag supporting platform positioned at the bottom of the apparatus, where the bottom of the heavy filled bag has been raised above the supporting platform in an unnatural position so as to illustrate the nature of the closed bottom end of the bag.

Turning now to a consideration of the rear elevational view of FIG. 5, parts of which are broken away, and other parts are in cross-section to clearly illustrate the present invention. As mentioned previously, the auxiliary frame 36 is formed of hollow steel tubing 38 which has both horizontal and vertical pieces that are welded together to form a strong open box construction. Located beneath the cartridge 74 of the plastic sheet tubing 76 is a throttle section 98 which is provided with mechanisms for collapsing the empty top of the large plastic bag into a rope-like formation 100 for a vertical distance of about six inches, as is illustrated in FIG. 5. The operation of these various mechanisms within the throttle section 98 will best be understood in the description of FIGS. 6-13.

Figure 6:
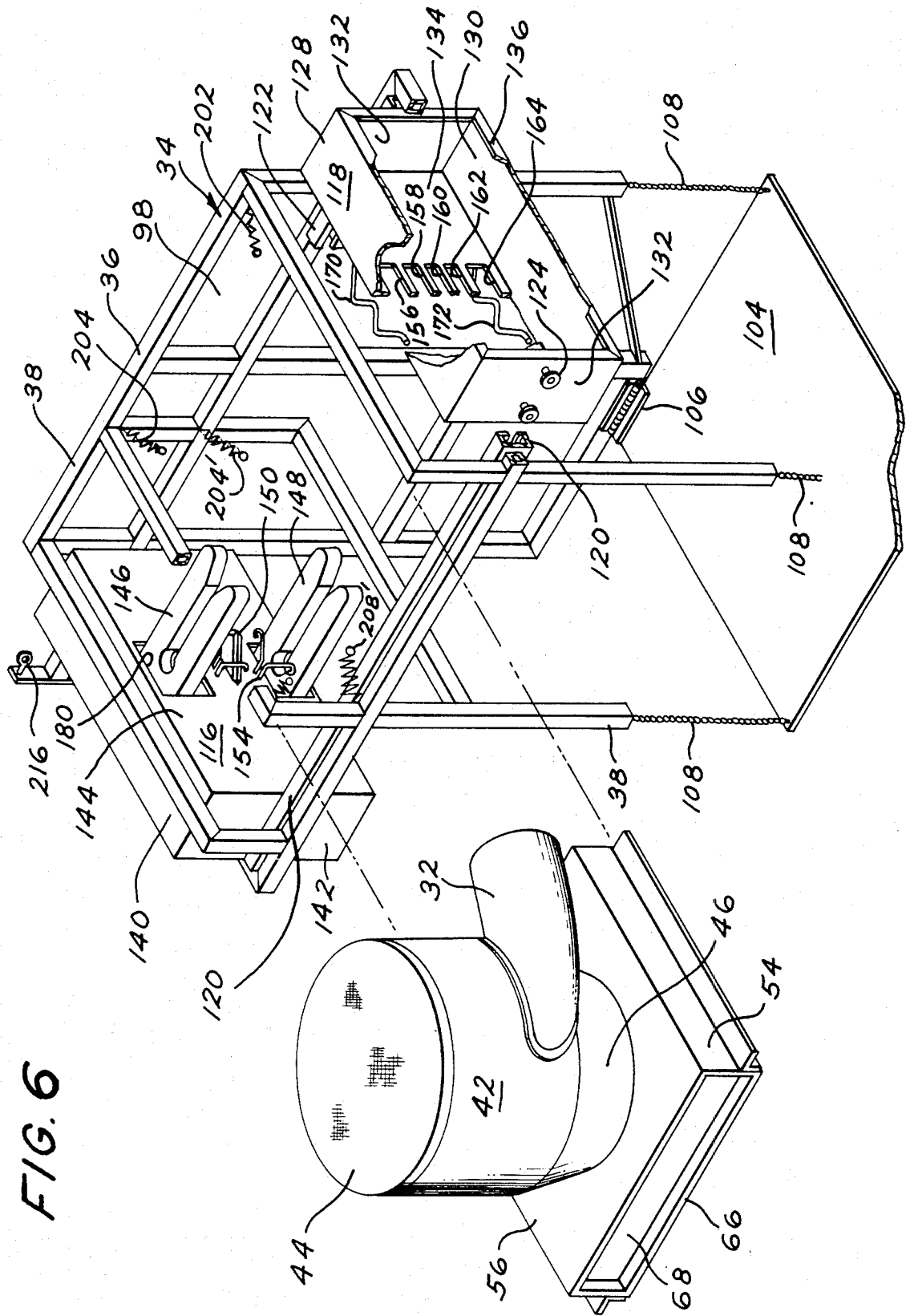
FIG. 6 is a right side, rear perspective partially exploded view of the auxiliary frame of the bag-forming apparatus of the present invention showing the open nature of the framework as well as the pair of track-mounted carriages for use in the throttle section of the apparatus. This Figure also shows to the left side of the drawing how the air-release funnel section and the annular cartridge of plastic sheet tubing are mounted on the top of this auxiliary frame.

Positioned below the throttle section 98 is the bag-filling section 102 which makes up most of the auxiliary frame 36 as is best seen in FIG. 1. The lowest portion of the auxiliary frame 36 includes a plastic bag supporting platform 104 as is best seen in FIG. 6. This bag supporting platform 104 is provided at one corner with a piano hinge 106 which allows the platform to pivot upwardly about a horizontal pivotal axis. The other three corners of this platform 104 are provided with vertical chains 108 which form flexible vertical continuations of the steel tubing 38 of the auxiliary frame. This hinge means 106 and these flexible chains 108 allow the platform to pivot upwardly about the hinge when the lawn mower is traversing sloping terrain, but prevent the platform from pivoting downwardly beyond a horizontal plane.

Figure 3:
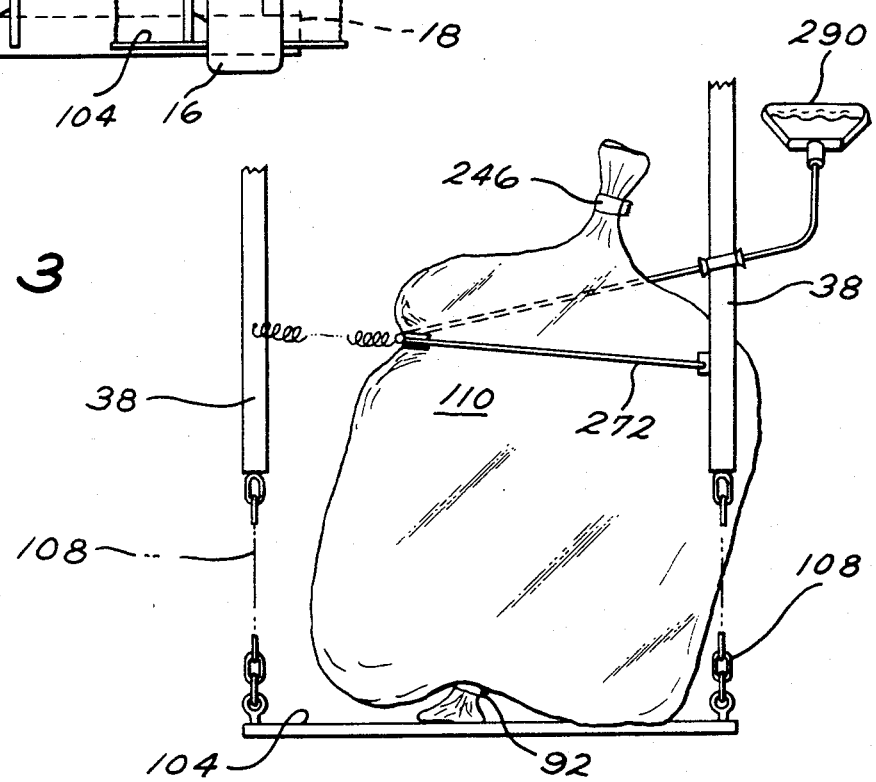
FIG. 3 is a fragmentary rear elevational view, on an enlarged scale, showing a filled and sealed bag supported on a movable platform, as well as cable means for discharging the sealed bag from the platform.

Looking at FIGS. 4 and 5, it should be understood that FIG. 4 shows a starting position for the plastic sheet tubing 76 as it is being formed into a bag. Remember the lower free end of the sheet tubing is gathered together as at 90 and sealed shut by the tape 92. Then the operator of the mower proceeds to drive over the terrain so that the spinning cutter blade (not shown) will cut any standing grass or leaves and the grass clippings and leaf shreads will fly up the chute 32 and be discharged into the funnel section 42 where they will form a whirlwind until the air is released through the wire screen 44 and the clippings descend by gravity into the plastic bag 110. The weight of these clippings will quickly increase causing the sheet tubing 76 to be pulled down from the annular cartridge 74 until the bottom of the bag rests upon the supporting platform 104. It should be understood that the lower end 90 of the plastic bag 110 is shown raised off the platform 104 in an unnatural position for purposes of illustration. Actually, in operation, the weight of the bag 110 will cause the bag to sit flat on the platform 104 as seen in FIG. 3 rather than to be suspended off of the platform as shown. Thus it will be understood that this platform 104 carries a heavy load of nearly a hundred pounds. The hinging action 106 of the platform 104 is provided to protect the platform from serious damage in the event the lawn mower were to ride into a ditch and the underside of the platform were to strike the edge or sloping areas of the ditch as the lawn mower finishes its descent and turns upwardly out of the ditch.

Figure 2:
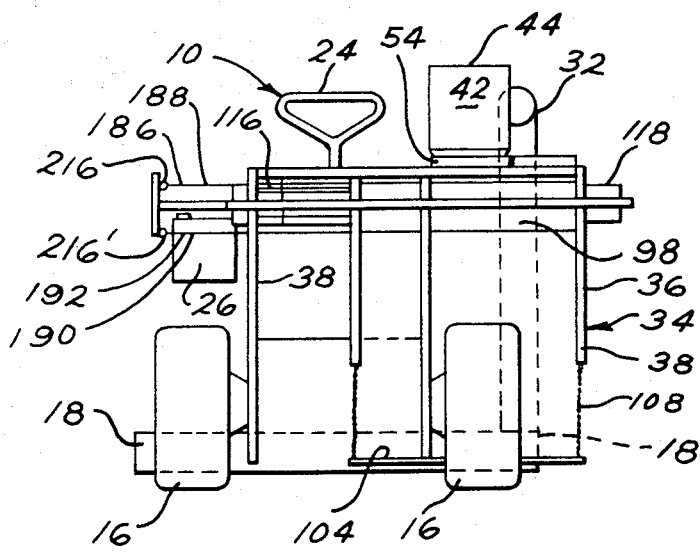
FIG. 2 is a rear elevational view of the lawn mower of FIG. 1 showing the bag-forming apparatus of the present invention in the nature of an open framework that is shifted off center to favor the right side of the machine.
Figure 7:
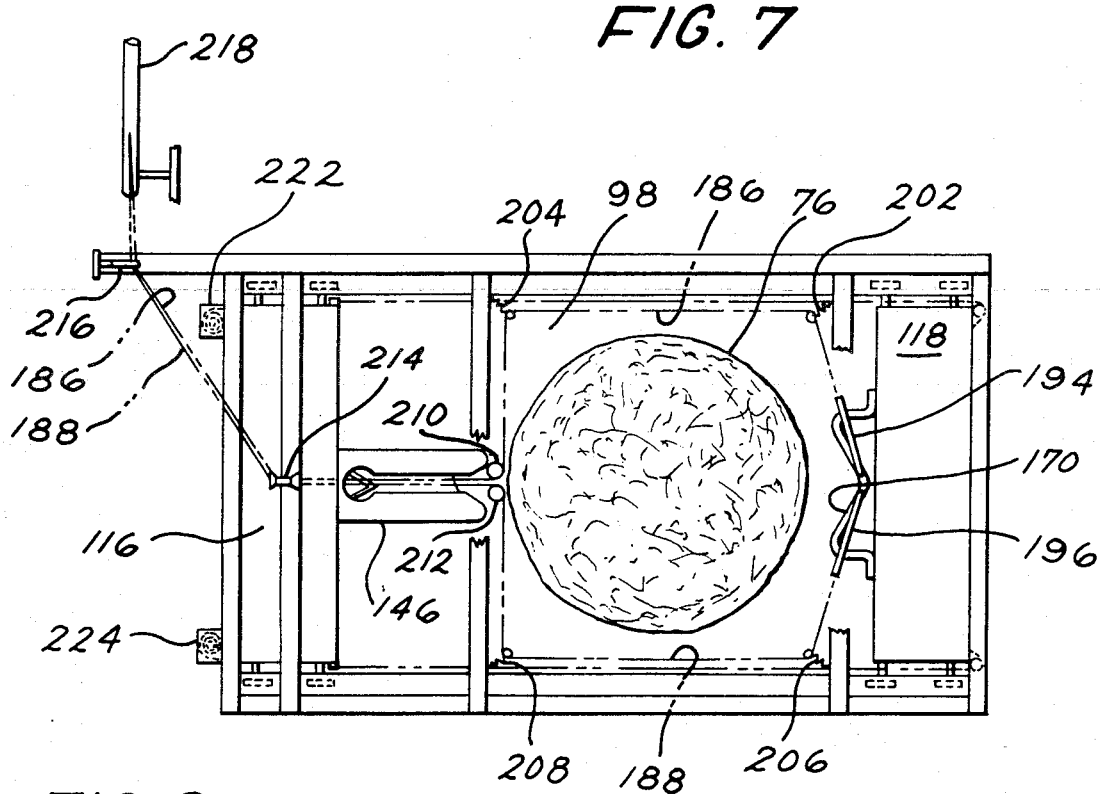
FIG. 7 is a top plan view of the bag-forming apparatus of the present invention taken on the line 7—7 of FIG. 5 just below the sheet tubing cartridge housing to show the upper set of the double loops of cable in dash lines located above the track-mounted carriages, and the plastic bag has been filled with grass cuttings to balloon the bag into a large cylindrical bag.

Now for a more complete understanding of the throttle section 98, attention will be given to FIGS. 5 and 6 of the drawings. This throttle section includes two track-mounted carriages 116 and 118 which are spaced apart from each other in their normal at-rest mode as illustrated in FIGS. 6 and 7. The left hand carriage 116 is positioned just behind the seat 22 of the operator as seen in FIG. 2, while the right hand carriage 118 opposes the other carriage and is located at the right side of the mower. There are two C-shaped tracks 120 and 122, as seen in traverse cross section that are arranged parallel to each other and extend transversely of the longitudinal axis of the mower 10. Each carriage has a pair of rollers 124 on each side thereof for riding within each track 120 and 122 so that the carriages are guided in their movement by the interaction between each track and the pair of rollers 124. It will be recognized by those skilled in this art that other wheel and track combinations could be substituted for the particular combination that is illustrated in the drawings. It is a primary concern that the carriages should not become track-bound or jammed and thereby prevent further movement of the carriage relative to the track.

Each track-mounted carriage 116 and 118 is formed of hollow sheet metal box-like construction. Carriage 118 has a top wall 128, a bottom wall 130, opposite side walls 132, a vertical front wall 134, and an open rear wall 136.

Figure 10:
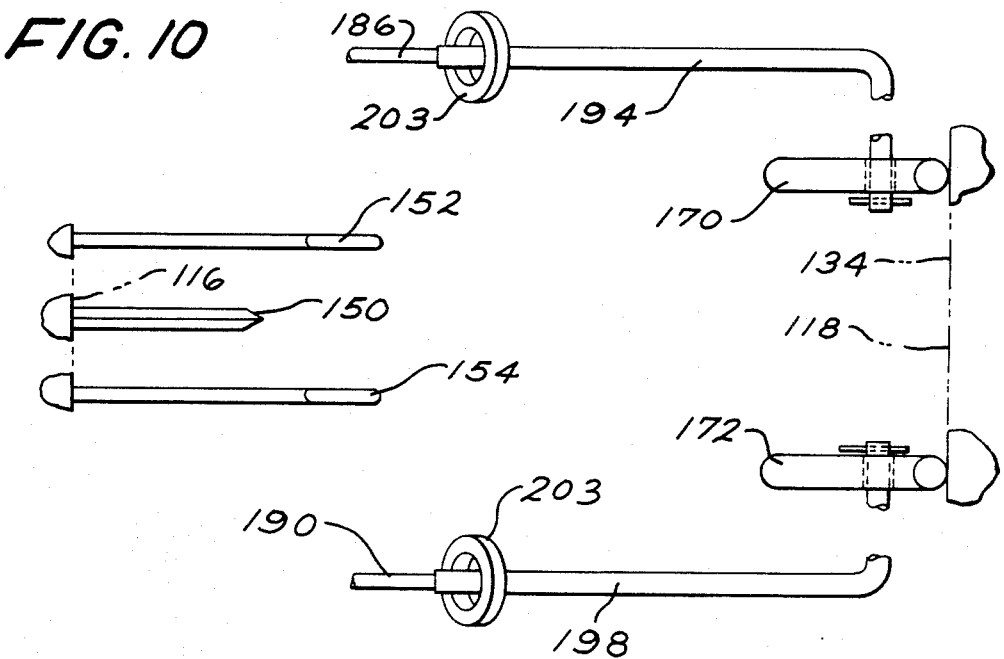
FIG. 10 is a fragmentary rear elevational view of the mechanism of FIG. 9.
Figure 9:
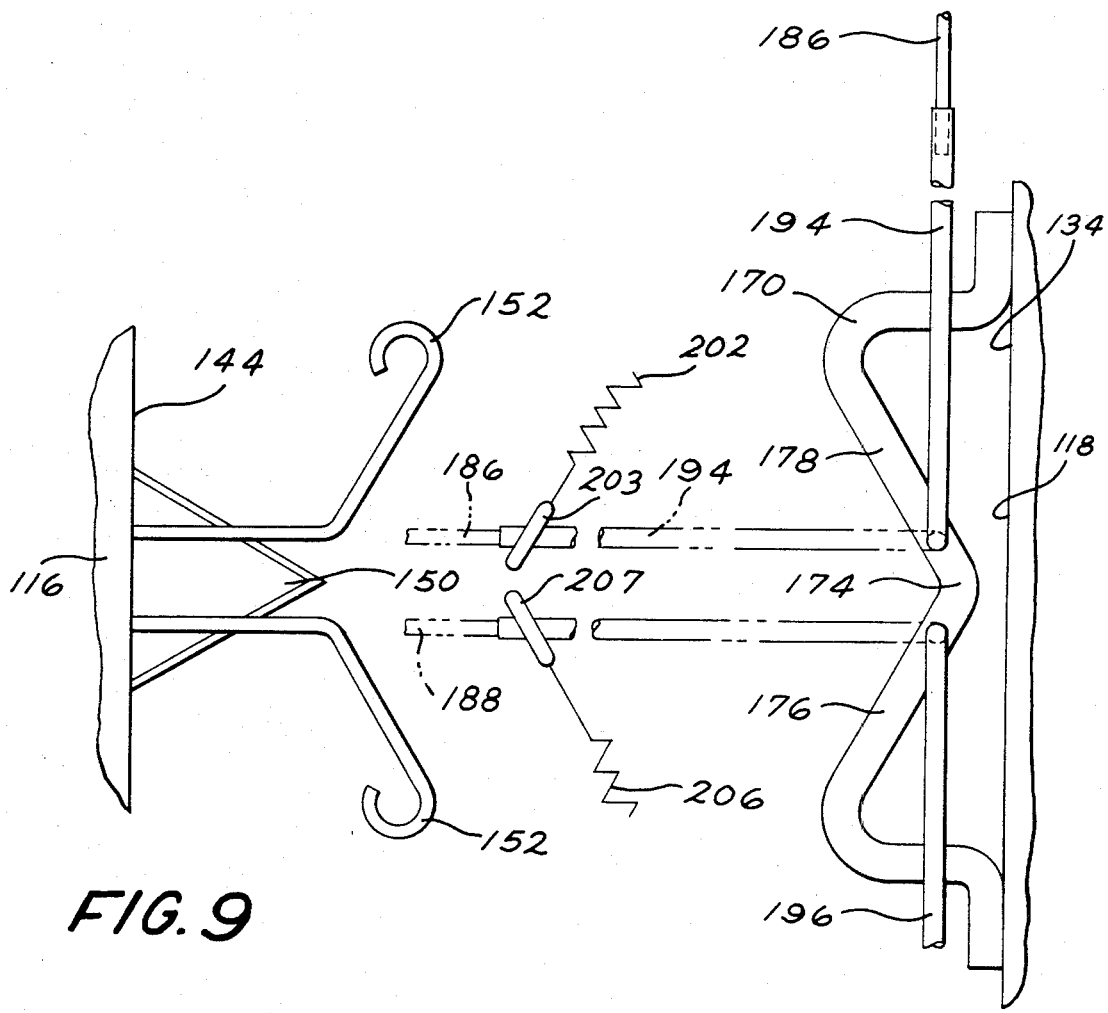
FIG. 9 is a fragmentary top plan view of some of the linkage mechanism used for collapsing the empty top of the plastic bag into a flat plane, as well as showing the cutter means and tapered guide rods for gathering in the plastic sheet tubing when the track-mounted carriages are brought together.

The left-hand carriage 116 is of similar construction, and it has a top wall 140, and opposite side walls 142, and a vertical front wall 144. The bottom wall and the rear wall are not visible in FIG. 6. Protruding from the vertical front wall 144 of the left-hand carriage 116 are two vertically spaced adhesive tape dispensers 146 and 148. Also mounted from this vertical front wall 144 of the left-hand carriage 116 is a sharp cutter blade 150 of spear head configuration, as is best seen in FIG. 10. Associated with this cutter blade 150 are an upper pair 152 and a lower pair 154 of tapered guide rods, as are best seen in FIGS. 9 and 10, that serve to gather the empty top of the plastic bag 110 into a rope-like formation, as is best seen in FIG. 5, for ease in taping the plastic tubing shut as well as cutting the rope-like formation 100 after a plastic bag 110 has been filled and sealed. Since the two carriages 116 and 118 are adapted to be brought close together, as is best seen in FIG. 13, the front wall 134 of the carriage 118 must include slots for receiving the various elements protruding from the front wall 144 of the left-hand carriage 116. For example, upper slot 156 receives the upper tape dispenser 146. The next lower slot 158 receives the upper tapered guide rods 152. The next lower slot 160 is adapted to receive the sharp cutter blade 150. The next lower slot 162 is adapted to receive the lower tapered guide rods 154. The lowest slot 164 is adapted to receive the lower adhesive tape dispenser 148.

The front wall 134 of the right-hand carriage 118 has two protruding members; namely, an upper tapered guide bar 170, which is located just above the upper tape dispenser 146, and a lower tapered guide bar 172, which is located just below the lower tape dispenser 148 as seen in FIG. 13. The configuration of both upper and lower guide bars 170 and 172 can best be understood in the top plan view of FIG. 9. Each guide bar has a central apex 174 from which extends two outwardly tapered sections 176 and 178. As is best seen in FIG. 13, there is a slot 180 for receiving the upper guide bar 170, as well as a slot 182 for receiving the lower guide bar 172 when the two carriages 116 and 118 are drawn together.

Figure 11:
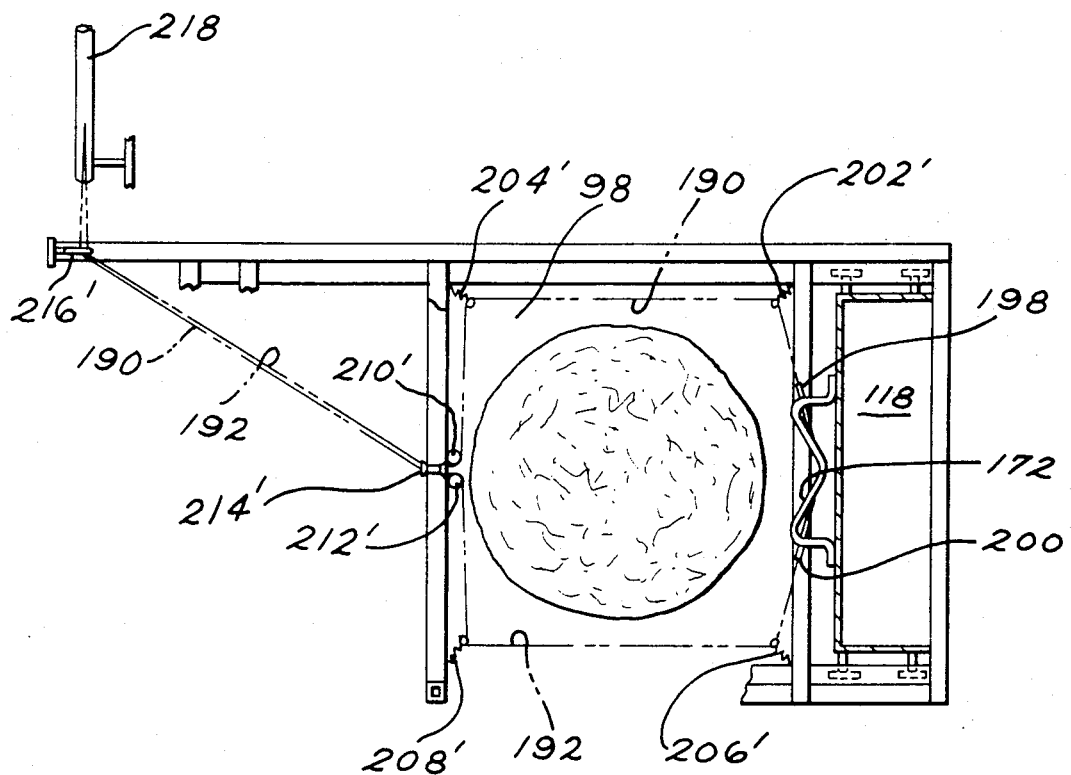
FIG. 11 is a top plan view of the bag-forming apparatus of the present invention taken on the line 11—11 of FIG. 5 to show the lower set of double loops of cable in dash lines located adjacent the bottom of the track-mounted carriages. The lefthand carriage has been removed to improve the clarity.

Next to be discussed are FIGS. 7-13, and particularly how the throttle section 98 is designed to collapse the empty top of the large plastic bag 110 into a rope-like formation 100, as is best seen in FIG. 5. First to be understood is the fact that FIG. 7 shows an upper set of cables of double loops 186 and 188 shown in dash lines, while FIG. 11 shows a lower set of cables of double loops 190 and 192 shown in dash lines. Both the upper and lower cables are designed to operate the same, so that a description of the upper set of cables should suffice in permitting the understanding of the lower set of cables. A pivoted anchor rod 194, as best seen in FIGS. 9 and 10, is attached to the upper guide bar 170 near the apex 174 thereof, and the cable loop 186 is attached to the free end of the anchor rod 194. A similar pivoted anchor rod 196 is mounted on the other side of the upper guide bar 170 for receiving the end of the cable loop 188 at the free end thereof, as seen in FIG. 7.

A similar pivoted anchor rod 198 is connected to the lower guide bar 172 for receiving the end of the cable loop 190 in the free end thereof, as is best seen in FIGS. 10 and 11. Another pivoted anchor rod 200 is joined to the lower guide bar 172, and the cable loop 192 is connected to the free end thereof.

Turning back to a consideration of the top plan view of FIG. 7, the upper cable loop 186 is held in an expanded square corner position by means of a first retractable tension member 202 in the upper right-hand corner, and by a second retractable tension member 204 in the upper left-hand corner. Similarly, the lower cable loop 188 is held in an expanded square corner position by a first retractable tension member 206 in the lower right-hand corner and a second retractable tension member 208 in the lower left-hand corner. A pair of pulleys 210 and 212 are closely spaced from each other at the left side of the throttle section 98 for receiving the upper set of the double cable loops 186 and 188 therearound, and the cables are joined together and passed through a sleeve 214, and the cables are drawn together and passed through a guide ring 216 and finally anchored to the midportion of a pivoted control lever 218 that is mounted to the left side of the mower chassis 12, as is best seen in FIG. 1.

Turning now to a consideration of the top plan view of FIG. 11, and the lower set of double loops of cable 190 and 192, the upper cable loop 190 is held in expanded square corner position by a retractable tension member 202' and a second retractable tension member 204'. In a similar manner, the lower cable loop 192 is held in an expanded square corner position by the first retractable tension member 206' and the second retractable tension member 208'. Moreover, there are two closely spaced pulleys 210' and 212' at the left side of the throttle section 98 for receiving the double cable loops 190 and 192 therearound, and these cable loops 190 and 192 are brought together and passed through a sleeve 214', and these two cables pass through a guide ring 216' and are finally anchored to the midportion of the pivoted control lever 218. Accordingly, the actuation of the control lever 218 will cause tension of the cable's loops so that the loops tend to straighten out, as is clear from FIG. 8, against the resistance of the retractable tension members 202, 204, 206 and 208. In fact, the cable loops 186 and 188 are drawn together so that they are generally parallel, as seen in FIG. 8, which causes the empty top of the large plastic bag 110 to collapse into a single plane 220 within the throttle section 98 of this apparatus.

Figure 8:
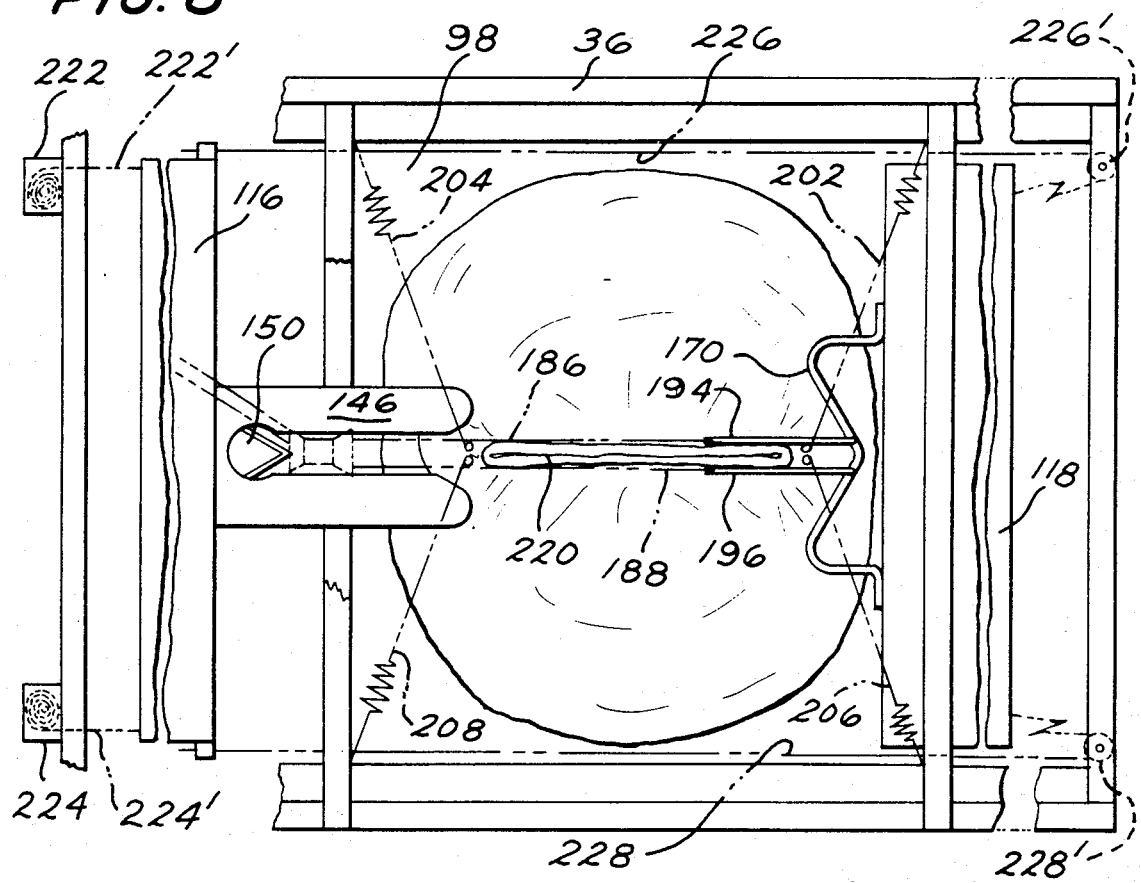
FIG. 8 is a top plan view, similar to that of FIG. 7, on a larger scale, showing the mechanism for collapsing the empty top of the plastic bag in the throttle section of the apparatus so that empty sheet tubing at the top of the filled bag is collapsed first into a flat plane that is generally parallel to the rear end of the lawn mower.

Looking at the top plan view of FIG. 8, there are two retractable cable reels 222 and 224, shown at the left side, having retractable cables 222' and 224' respectively that are both joined to the left-hand carriage 116. Moreover, there are two connecting cables 226 and 228 joined between the first carriage 116 and the second carriage 118. The first connecting cable 226 passes around a pulley 226' that is supported on the auxiliary frame 36 to the right side of the carriage 118. In a similar manner, the connecting cable 228 passes around a pulley 228'.

Figure 12:
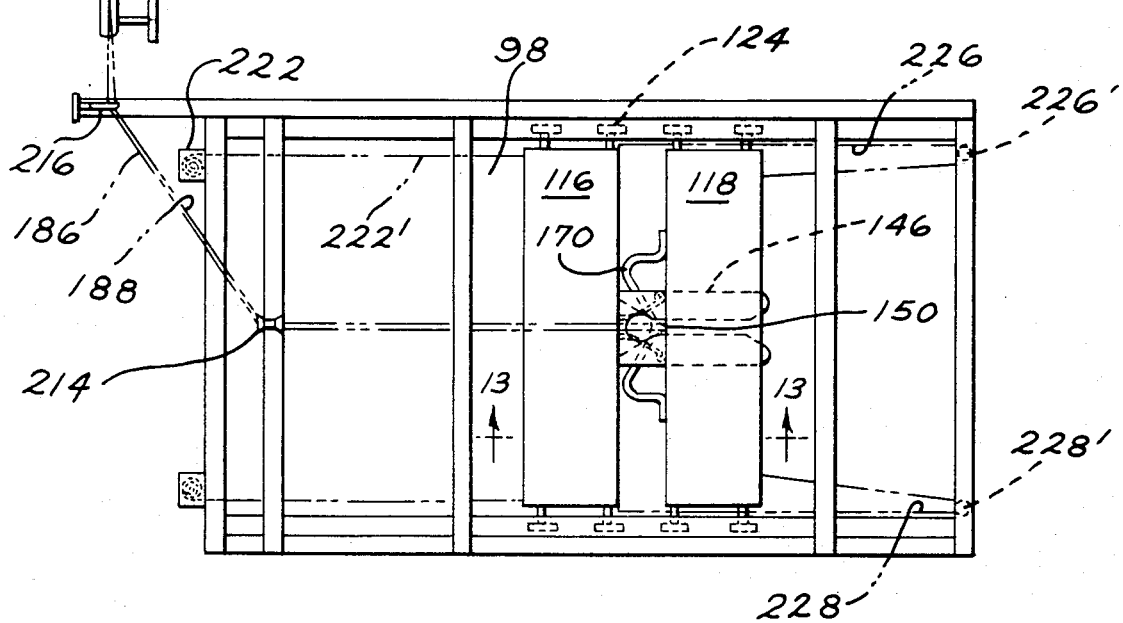
FIG. 12 is a top plan view, similar to that of FIG. 7, after the two track-mounted carriages have been pulled together and just before they come to rest in a final closed position.

Now, it is to be remembered that when the pivoted control lever 218 is thrown from its normal at-rest position of FIG. 1 to its forward position tension is applied to the upper and lower sets of double loops of cable 186, 188, 190 and 192 causing these double loops to straighten out, as is illustrated in FIG. 8. Then, further tension on these cables causes the right-hand carriage 118 to move toward the center of the apparatus, and, in so doing, the connecting cables 226 and 228 cause the left-hand carriage 116 to move toward the center, as is illustrated in FIG. 12. Remember the ends of the cable loops 186 and 188 are joined to the guide bar 170 by means of the pivoted rods 194 and 196. It is during this operation that the flattened plane 220 of the empty top of the plastic bag 110 is acted upon by the upper and lower tapered guide bars 170 and 172, as well as by the upper and lower pair of tapered guide rods 152 and 154, thereby causing the plastic to assume a rope-like formation 100, as illustrated in FIG. 5, until the two carriages 116 and 118 actually come together, as illustrated in FIG. 13, when the sharp cutter blade 150 slices the rope-like formation apart, as is depicted in FIG. 5 where the two carriages 116 and 118 are moving apart to return to their normal at-rest positions of FIG. 6.

Figure 14:
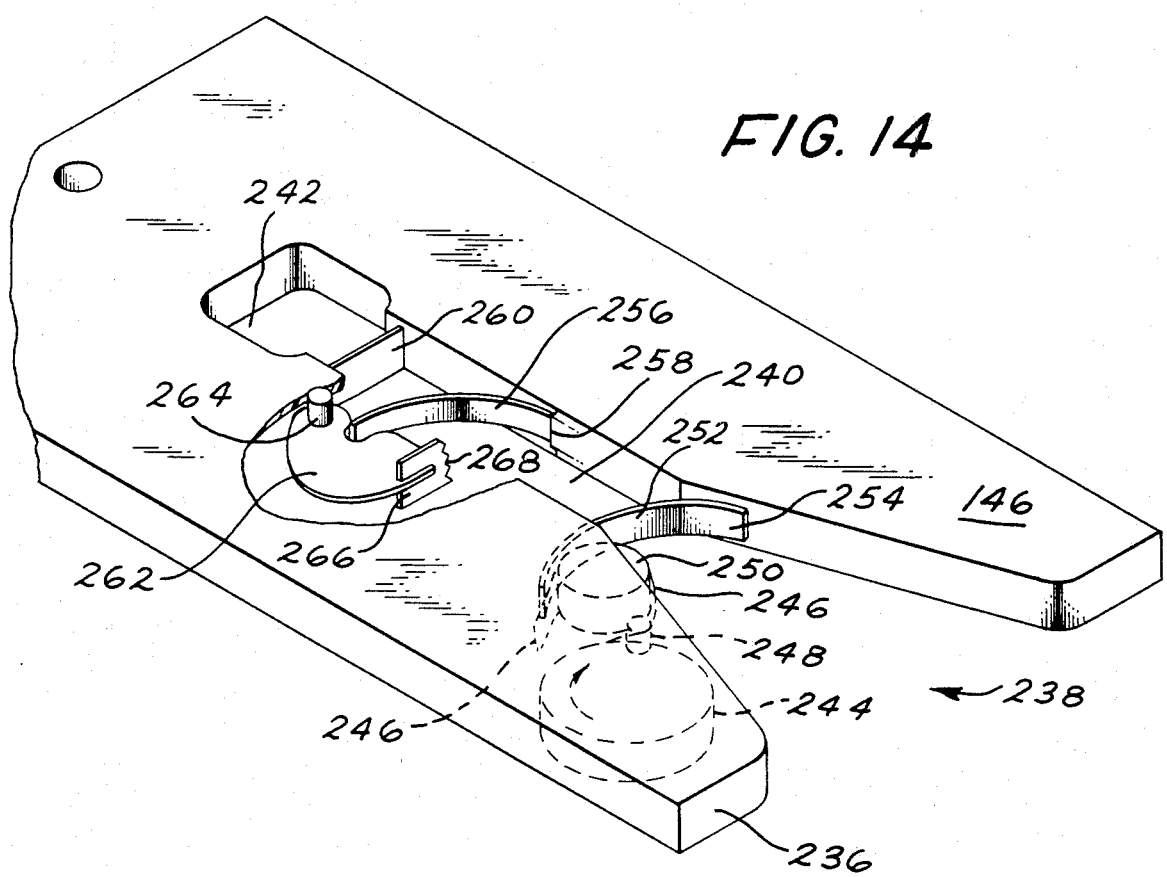
FIG. 14 is a perspective view of one of the two standard pressure-sensitive tape dispensers, on an enlarged scale, with parts broken away to show interior details of construction.

Up to this time, the construction and operation of the two vertically spaced adhesive tape dispensers 146 and 148 have not been described. Both tape dispensers 146 and 148 may be identical, therefore, only one of them will be described for purposes of brevity. Since the tape dispenser is a vital part of this plastic sheet tubing, bag-forming apparatus 34, it should be or rugged construction so that it will be long-wearing and reliable in operation, because if it were to malfunction, the entire apparatus would be inoperative. The tape dispenser 146 as seen in FIG. 14 is generally of flat elongated configuration having a front end 236 with a wide, V-shaped opening 238 for receiving the rope-like formation 100 of the plastic sheet tubing 76. Extending longitudinally of the dispenser from this V-shaped opening 238 is an elongated slot 240 which extends for nearly the complete lenght thereof until it terminates in an enlarged pocket 242. The near side of the dispenser housing is generally hollow for containing a spool 244 of adhesive tape 246. This tape 246 has its adhesive surface on the underside. A turning post 248 is positioned close to the periphery of the reel 244 and the tape passes around a portion of the post and then the tape winds around a rotatable wheel 250 which has a portion of the wheel exposed within the V-shaped opening 238 so that as this tape dispenser 146 is drawn toward the rope-like formation 100 of the plastic tubing the adhesive tape will adhere to the side of the plastic rope. Associated with this rotatable wheel 250 is a tension member 252 in the form of a spring blade that is attached at one end to the side of the V-shaped opening that is opposite the rotatable wheel 250, as at 254. This tension spring blade 252 extends transversely across the elongated slot 240 and is in wiping engagement with the periphery of the rotatable wheel 250, and the adhesive tape 246 is sandwiched between the tension member 252 and the wheel 250. Thus as the dispenser 146 moves toward the rope-like formation 100, the rope will move the tension blade 252 until the blade generally straightens out lengthwise of the elongated slot 240, and in so doing the adhesive tape 246 is wrapped around the rope-like formation 100 until the end of the tape overlaps a section of the tape and adheres together. As the dispenser continues its movement, the rope-like formation 100 passes down the elongated slot 240 until it engages a second tension member 256 that is also in the form of a spring blade. One end of this tension blade 256 is attached to one side of the elongated slot 240 as at 258. This second tension blade 256 also extends transversely of the slot 240 as an obstruction so that as the rope-like formation 100 continues down the slot, it will cause this tension blade to straighten out which serves to tighten the adhesive tape 246 around the rope-like formation. A trip lever 260 is positioned transversely across the slot 240 for engagement by the plastic rope 100 as it moves down the slot. This trip lever is joined to a pivoted flat plate 262 which moves about the pivot pin 264. Assembled on the free end of the flat plate 262 is a vertical clip 266 having a jagged cutter edge 268 which is adapted to capture the adhesive tape 246 against the tension blade 256 and sever the tape. When this occurs, the adhesive tape 246 will be wrapped partially around the rotatable wheel 250 by the return of the first tension blade 252 to its position as shown in FIG. 14. Once the adhesive tape 246 is tightly wound around the rope-like formation 100 and sealed together and then cut loose from the spool of tape 244, then the cutter blade 150 will sever the rope-like formation when the two carrages are finally brought into striking engagement as is best seen in FIG. 13. Then the operator will return the control lever 218 to its normal rest position which allows the two retractable cable reels 222 and 224 of FIG. 8 to return the left-hand carriage 116 to its at-rest position. Since the other carriage 118 is operatively connected to carriage 116, both carriages will move in unison to their normal position of FIG. 7.

Once the cutter blade 150 severs the rope-like formation 100, a complete plastic bag 110 that is fully loaded and sealed shut at both ends has been created as is clear from FIG. 3. The sealed bag 110 will be completely supported on lower supporting platform 104 by means of the chains 108 hanging from the vertical steel tubing 38.

Figure 15:
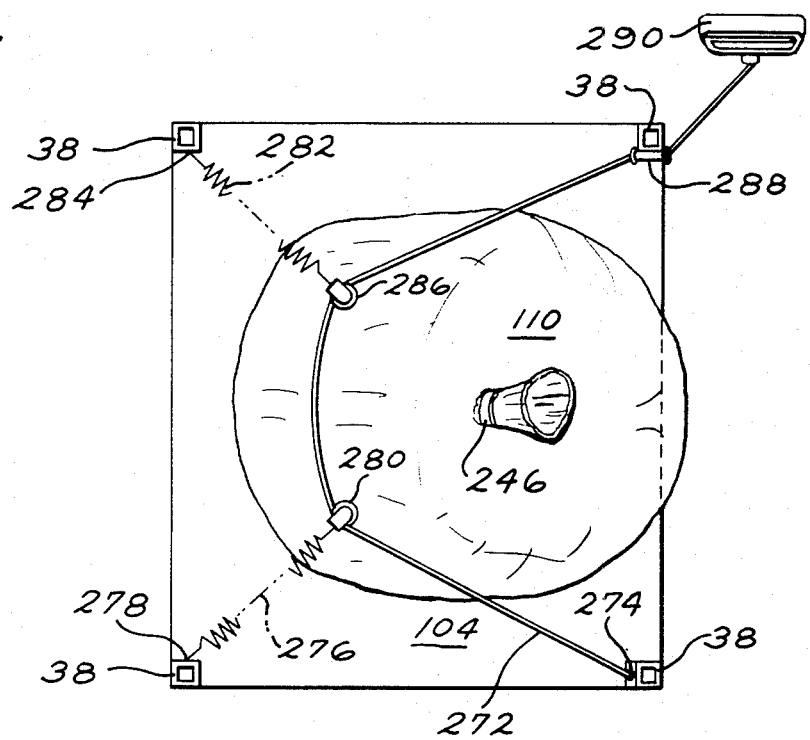
FIG. 15 is a top plan view of FIG. 3 showing a manual cable means for discharging a filled and sealed bag from its supporting platform by means of a pull cable.

A means has been devised for unloading the plastic bag 110 from the platform so that the operator may reengage the mower blade and continue cutting the grass. Attention is drawn to both FIGS. 3 and 15 which show a pull cable 272 anchored at one end 274 to one of the rear vertical runs of steel tubing 38. A retractable tension member 276 is anchored at one end 278 to the tubing 38 and it has a pulley 280 at its other end for receiving the cable 272. A second retractable tension member 282 is anchored at end 284 to an adjacent tubing 38, and there is a pulley 286 for receiving the cable 272. A guide sleeve 288 is mounted on the tubing in the fourth corner of the platform for receiving the cable 272 therethrough. The end of the cable is furnished with a handle 290 so that the operator may use his right hand to engage the handle and pull the cable 272 so as to force the plastic bag 110 to tumble from the platform 104 onto the ground. Then the complete cycle of the operation of this bag-forming apparatus has run its course. At this time the apparatus 34 is in the position as shown in FIG. 4 of the drawings, and ready to start again. The operator need only reengage the mower blade and continue cutting the lawn, thereby discharging grass clippings into the funnel section 42 which will load the sealed end of the plastic tubing 76 until it descends by gravity forming a large plastic bag 110 until it reaches the supporting platform 104. This plastic tubing 76 has been made of transparent or translucent material so that the operator can view the amount of the contents at all times so that he will be careful not to overload the plastic tubing, because it would not be possible to close and seal the top of the bag if the top of the bag were over-loaded with grass cuttings. It is best not to fill the plastic bags too full so that the throttle section 98 of the apparatus can function as it was designed.

Modifications of this invention will occur to those skilled in this art. Therefore, it is to be understood that this invention is not limited to the particular embodiments disclosed, but that it is intended to cover all modifications which are within the true spirit and scope of this invention as claimed.

What is claimed is:

1. A lawn care machine having a mobile main frame which carries high velocity airstream means for removing material from the ground and moving it through a discharge opening, the improvement comprising:
   a. an auxiliary frame adapted to be supported from the rear of said machine and having an air-release funnel section at the top of this frame for receiving the delivery of material from the said discharge opening and separating out much of the airstream from the material, the lower end of the funnel section having a discharge opening through which the material falls;
   b. a supply of large plastic sheet tubing that is folded lengthwise into a compact annular cartridge that is arranged horizontally beneath the discharge opening of the funnel section;
   c. a plastic bag supporting platform positioned at the bottom of the auxiliary frame for supporting a plastic bag after it is formed from the plastic sheet tubing and filled by the removed ground material;
   d. whereby the leading edge of the said supply of large plastic sheet tubing is first sealed to create the bottom of a plastic bag, so that as the ground material passes through both the funnel section and the annular cartridge the plastic bag is being filled causing it to pay out from the cartridge and pass downward by gravity due to its increasing weight and volume until the bag comes to rest on the said supporting platform;
   e. a throttle section positioned beneath the cartridge of plastic sheet tubing comprising double-acting means for collapsing the empty top of the filled plastic bag while in place into a generally flat plane, as well as applying a collapsing force at the opposite ends of this generally flat plane to gather the plastic sheet tubing into a rope-like formation, and a pair of vertically-spaced sealing means for sealing the plastic rope-like formation at two locations, and cutter means for severing the rope-like formation at a location between the two sealed locations so as to seal both the top of the filled plastic bag and seal the bottom of the next bag to be formed;
   f. and remote control means for operating the said throttle section of the auxiliary frame to effect the collapsing operation of the top of the bag, as well as for operating the two sealing means, and operating the cutter means;
   g. and remote control means for unloading the sealed bag from the supporting platform.

2. A lawn care machine having a mobile main frame which carries high velocity airstream means for removing material from the ground and moving it through a discharge opening, the improvement comprising:
   a. an auxiliary frame adapted to be supported from the rear of said machine and having an air-release funnel section at the top of this frame for receiving the delivery of material from the said discharge opening and separating out much of the airstream from the material, the lower end of the funnel section having a discharge opening through which the material falls;
   b. a supply of large plastic sheet tubing that is folded lengthwise into a compact annular cartridge that is arranged horizontally beneath the discharge opening of the funnel section;
   c. a plastic bag supporting platform positioned at the bottom of the auxiliary frame for supporting a plastic bag after it is formed from the plastic sheet tubing and filled by the removed ground material;
   d. whereby the leading edge of the said supply of large plastic sheet tubing is first sealed to create the bottom of a plastic bag, so that as the ground material passes through both the funnel section and the annular cartridge the plastic bag is being filled causing it to pay out from the cartridge and pass downward by gravity due to its increasing weight and volume until the bag comes to rest on the said supporting platform;
   e. a throttle section positioned beneath the cartridge of plastic sheet tubing comprising double-acting means for collapsing the empty top of the filled plastic bag while in place into a rope-like formation, and a pair of vertically-spaced sealing means for sealing the plastic rope-like formation at two locations, and cutter means for severing the rope-like formation at a location between the two sealed locations so as to seal both the top of the filled plastic bag and seal the bottom of the next bag to be formed;
   f. and remote control means for operating the said throttle section of the auxiliary frame to effect the collapsing operation of the top of the bag, as well as for operating the two sealing means, and operating the cutter means;
   g. and remote control means for unloading the sealed bag from the supporting platform;
   h. the said double-acting collapsing means of the throttle section includes a first double-acting means for collapsing the empty top portion of the said filled plastic bag into a generally flat plane, and a second double-acting means for both gathering the said flat plane of the top of the filled plastic bag into a rope-like formation and holding it taut, while the said cutter means severs the finally sealed plastic bag from the plastic sheet tubing of the annular cartridge.

3. A lawn care machine having a mobile main frame which carries means for removing material from the ground and moving it through a discharge opening, the improvement comprising:
   a. an auxiliary frame adapted to be supported from the rear of said machine and having an air-release funnel section at the top of this frame for receiving the delivery of material through the said discharge opening, the lower end of the funnel section having a discharge opening;

b. a supply of large plastic sheet tubing that is folded lengthwise into an annular cartridge that is arranged horizontally beneath the discharge opening of the funnel section;

c. a plastic bag supporting platform positioned at the bottom of the auxiliary frame for supporting a plastic bag that contains the removed ground material;

d. whereby the leading edge of the said supply of large plastic sheet tubing that is fed from the cartridge is first sealed to create a plastic bag, so that as the ground material passes through both the funnel section and the annular cartridge the plastic bag is being filled causing it to balloon outward and pass downward by gravity due to its increasing weight until the bag comes to rest on the said supporting platform;

e. a throttle section positioned beneath the cartridge of plastic sheet tubing for collapsing the large plastic sheet tubing into a rope-like formation, and a pair of vertically-spaced sealing means for sealing the plastic rope-like formation at two locations, and cutter means for severing the rope-like formation at a location between the two sealed locations;

f. wherein the said throttle section includes a first means for collapsing the top portion of the said plastic bag into a generally flat plane, and a second means for collapsing the said flat plane of the plastic bag into a rope-like formation and capable of holding it taut, wherein the said first means of the throttle section for collapsng the top portion of the plastic bag into a generally flat plane is a flexible cable system comprising a pair of vertically-spaced double loops of cable wherein each double loop of cable conforms to a generally rectangular wide-open configuration when the system is in the at-rest mode to allow for the filling and expansion and lowering of the plastic bag onto the said supporting platform, and each of the pair of double loops of cable are operated simultaneously for closing each double loop of cable on itself so that the previous, generally rectangular, wide-open configuration converts into a pair of parallel, closely spaced runs of cable with the top portion of the plastic bag squeezed shut therebetween.

4. The inventionas recited in claim 3 wherein each one of the double loops of cable has a first fixed end and a second movable tension end, each loop having a generally right-angular corner formation when in the at-rest mode, each said corner formation including a reel with an automatic retractable cable attached to the loop of the cable to create the right-angular corner formation when the cable system is in the at-rest mode, said retractable cable serving to pay out from the reel when a tension is applied to the second movable tension end of each loop of cable, thereby allowing each double loop of cable to straighten out into the said pair of parallel, closely spaced runs of cable as long as tension is held on the double loops of cable.

5. The invention as recited in claim 4 wherein the said second means of the throttle section for collapsing the said flat plane of the top portion of the plastic bag into a rope-like formation comprises a pair of opposed, track-mounted carriages which are spaced away from each other in their normal at-rest mode, and operating means joined to the first carriage for causing this carriage to advance toward the second carriage, and interconnecting means joining the two carriages so that an advancing movement of the first carriage will cause an advancing movement of the second carriage, and retractable cable means joined to the second carriage for causing the second carriage to retreat to its at-rest mode when the said operating means is released, the said interconnecting means then operating in reverse to cause the first carriage to likewise retreat to its at-rest mode, one carriage being furnished with the said cutter means as well as with the said pair of vertically spaced sealing means, while the other carriage is furnished with choking means above and below each sealing means for gathering the top portion of the plastic sheet tubing within the said throttle section into a rope-like formation in preparation for the cutting action, said other carriage also including receiver openings for receiving the cutter means and the pair of sealing means therein.

6. The invention as recited in claim 5 wherein the said operating means that is joined to the first carriage is the said flexible cable system that also serves to collapse the top portion of the plastic bag into a generally flat plane, said cable system only acting sequentially as the operating means of the first carriage after the cable system has finished collapsing the top portion into a flat plane.

7. The invention as recited in claim 6 wherein the said pair of track-mounted carriages are positioned to operate transversely across the auxiliary frame and along the back of the mobile main frame, and the said flexible cable system having an operating portion that leads off to one side of the said auxiliary frame, and directional means provided on the auxiliary frame to redirect the operating portion of the cable system forwardly and downwardly along one side of the mobile main frame for connection to a manual operating lever for controlling the cable system working within the throttle section.

8. The invention as recited claim 1 wherein each of said sealing means is a self-adhesive tape dispenser which includes a hollow housing having an elongated slot extending from the front edge to nearly the rear portion thereof, the front entrance to the slot having a pair of widely spaced guide walls which taper inwardly to meet the adjacent wall of the elongated slot for receiving and gathering in the top portion of the plastic bag, a reel of self-adhesive tape located in the housing at the inner end of the tapered entrance to the slot for automatically wrapping around the rope-like formation of the empty top of the plastic bag, and tape cutter means located in the dispenser housing toward the rear end of the slot for automatically cutting the tape after the sealing action, whereby the lowermost tape dispenser seals the top of the filled bag closed, while the upper tape dispenser seals the bottom end of the large plastic sheet tubing to form the closed bottom of the next plastic bag to be formed and filled.

9. The invention as recited in claim 1 wherein the said plastic bag suporting platform at the bottom of the said auxiliary frame includes hinge support means adjacent one corner of the frontmost edge, and flexible tension members supported down from the auxiliary frame and joined to each of the remaining three corners of the platform for supporting the same in a generally horizontal suspended position, whereby the platform is capable of hinging upwardly in the event this lawn care machine were to ride into a ditch and the underside of the platform were to strike the edge or sloping areas of the ditch.

10. A self-propelled riding lawn mower furnished with a plastic sheet tubing bagging system for disposing of the grass cuttings and other ground litter, said sheet tubing bagging system comprising:
   a. an auxiliary frame adapted to be supported on the rear of the lawn mower and including an air-release funnel section at the top, the lawn mower having a blade housing with a discharge opening giving off a high velocity airstream for transporting the grass cuttings, an upwardly inclined delivery chute connected between the said discharge opening of the lawn mower and the air-release funnel section, the airstream becoming separated from the grass cuttings and returning to the atmosphere, and a discharge opening for the grass cuttings in the bottom of the funnel;
   b. a supply of large plastic sheet tubing that is folded lengthwise into a compact annular cartridge and arranged horizontally beneath the discharge opening of the funnel section;
   c. a plastic bag supporting platform positioned at the bottom of the auxiliary frame at a distance beneath the annular cartridge of plastic sheet tubing for providing space for supporting a plastic bag full of grass cuttings thereon;
   d. the lower leading end of the plastic sheet tubing being adapted to be pulled down from the annular cartridge and sealed shut to create a closed bottom portion of a plastic bag so that as the grass cuttings are passed upwardly through the said delivery chute and then downwardly through the funnel section and through the annular cartridge of plastic tubing, the plastic bag begins to fill with grass cuttings causing it to balloon outwardly and pass downwardly by gravity due to the weight and volume of the bag contents until the bag comes to rest upon the lower platform;
   e. a remote controlled means for collapsing the empty top of the filled plastic bag while in place into a generally flat plane, as well as applying a collapsing force at the opposite ends of this generally flat plane to gather the plastic sheet tubing into a rope-like formation;
   f. and a remotely controlled pair of vertically spaced plastic bag sealing means located in the auxiliary frame beneath the annular cartridge of plastic sheet tubing for engaging the rope-like formation and sealing both the upper end of a filled plastic bag as well as sealing the lower end of the next-to-be-formed plastic bag that is positioned above the filled bag;
   g. and a remote controlled cutter means for severing the rope-like formation at a location intermediate the said two vertically spaced sealing means;
   h. and a remote controlled unloading means for removing the sealed bag from its supporting platform.

11. The invention as recited in claim 10 wherein the said air-release funnel section is a centrifugal cyclone device with a top screen wall for allowing the escape of the airstream therefrom while the grass cuttings fall by gravity through the center of the said annular cartridge into the plastic bag being drawn down out of the said cartridge.

12. A self-propelled riding lawn mower furnished with a plastic sheet tubing bagging system for disposing of the grass cuttings and other ground litter, said sheet tubing bagging system comprising:
   a. an auxiliary frame adapted to be supported on the rear of the lawn mower and including an air-release funnel section at the top, the lawn mower having a blade housing with a discharge opening giving off a high velocity airstream for transporting the grass cuttings, an upwardly inclined delivery chute connected between the said discharge opening of the lawn mower and the air-release funnel section, the airstream becoming separated from the grass cuttings and returning to the atmosphere, and a discharge opening for the grass cuttings in the bottom of the funnel;
   b. a supply of large plastic sheet tubing that is folded lengthwise into a compact annular cartridge and arranged horizontally beneath the discharge opening of the funnel section;
   c. a plastic bag supporting platform positioned at the bottom of the auxiliary frame at a distance beneath the annular cartridge of plastic sheet tubing for providing space for supporting a plastic bag full of grass cuttings thereon;
   d. the lower leading end of the plastic sheet tubing being adapted to be pulled down from the annular cartridge and sealed shut to create a closed bottom portion of a plastic bag so that as the grass cuttings are passed upwardly through the said delivery chute and then downwardly through the funnel section and through the annular cartridge of plastic tubing, the plastic bag begins to fill with grass cuttings causing it to balloon outwardly and pass downwardly by gravity due to the weight and volume of the bag contents until the bag comes to rest upon the lower platform;
   e. A remote controlled means for collapsing the empty top of the filled plastic bag while in place into a rope-like formation;
   f. and a remotely controlled pair of vertically spaced plastic bag sealing means located in the auxiliary frame beneath the annular cartridge of plastic sheet tubing for engaging the rope-like formation and sealing both the upper end of a filled plastic bag as well as sealing the lower end of the next-to-be-formed plastic bag that is positioned above the filled bag;
   g. and a remote controlled cutter means for severing the rope-like formation at a location intermediate the said two vertically spaced sealing means;
   h. and a remote controlled unloading means for removing the sealed bag from its supporting platform;
   i. the said air-release funnel section is a centrifugal cyclone device with a top screen wall for allowing the escape of the airstream therefrom while the grass cuttings fall by gravity through the center of the said annular cartridge into the plastic bag being drawn down out of the said cartridge;
   j. the said remote controlled collapsing means comprises a first double-acting mechanism that collapses the open top of the plastic bag into a generally flat plane, as well as a second double-acting mechanism that applies a collapsing force at the opposite ends of this flat plane to gather the plastic sheet tubing into the said rope-like formation.

13. The invention as recited in claim 12 wherein the said first mechanism of the bag throttle means comprises a flexible cable system with a pair of vertically spaced double loops of cable wherein each of the two double loops conforms to a generally rectangular, wide-open configuration when the cable system is in its at-rest mode to allow for the filling and expansion and lowering of the plastic bag onto the said support platform, and each of the pair of double loops of cable are operated simultaneously for closing each double loop of cable on itself so that the previous, generally rectangular, wide-open configuration converts into a pair of parallel, closely spaced runs of cable with the top portion of the plastic bag squeezed shut therebetween.

14. The invention as recited in claim 13 wherein each one of the double loops of cable has a first fixed end and a second movable tension end, each loop having a generally right-angular corner formation when in the at-rest mode, each said corner formation including a reel with an automatic retractable cable attached to the loop of the cable to create the right-angular corner formation when the cable system is in the at-rest mode, said retractable cable serving to pay out from the reel when a tension is applied to the second movable tension end of each loop of cable, thereby allowing each double loop of cable to straighten out into the said pair of parallel, closely spaced runs of cable as long as tension is held on the double loops of cable.

15. The invention as recited in claim 14 wherein the said second mechanism of the bag throttle means comprises a pair of opposed, track-mounted carriages which are spaced away from each other in their normal at-rest mode, and operating means joined to the first carriage for causing this carriage to advance toward the second carriage, and interconnecting means joining the two carriages so that an advancing movement of the first carriage will cause an advancing movement of the second carriage, and retractable cable means joined to the second carriage for causing the second carriage to retreat to its at-rest mode when the said operating means is released, the said interconnecting means then operating in reverse to cause the first carriage to likewise retreat to its at-rest mode, one carriage being furnished with the said cutter means as well as with the said pair of vertically spaced sealing means, while the other carriage is furnished with choking means above and below each sealing means for gathering the top portion of the plastic sheet tubing within the said throttle section into a rope-like formation in preparation for the cutting action, said other carriage also including receiver openings for receiving the cutter means and the pair of sealing means therein.

16. The invention as recited in claim 15 wherein the said operating means that is joined to the first carriage is the said flexible cable system that also serves to collapse the top portion of the plastic bag into a generally flat plane, said cable system only acting sequentially as the operating means of the first carriage after the cable system has finished collapsing the top portion into a flat plane.

17. The invention as recited in either one of claims 7, 10 or 16 wherein each of said pair of bag sealing means is a self-adhesive tape dispenser which includes a hollow housing having an elongated slot extending from the front edge to nearly the rear portion thereof, the front entrance to the slot having a pair of widely spaced guide walls which taper inwardly to meet the adjacent wall of the elongated slot for receiving and gathering in the top portion of the plastic bag, a reel of self-adhesive tape located in the housing at the inner end of the tapered entrance to the slot for automatically wrapping around the rope-like formation of the plastic bag, and tape cutter means located in the dispenser housing toward the rear end of the slot for automatically cutting the tape after the sealing action, whereby the lowermost tape dispenser seals the top of the filled bag closed, while the upper tape dispenser seals the bottom end of the large plastic sheet tubing to form the closed bottom of the next plastic bag to be filled.

18. The invention as recited in either one of claims 7, 10 or 16 wherein the said plastic bag supporting platform at the bottom of the said auxiliary frame includes hinge support means adjacent one corner of the frontmost edge, and flexible tension members supported down from the auxiliary frame and joined to each of the remaining three corners of the platform for supporting the same in a generally horizontal suspended position, whereby the platform is capable of hinging upwardly in the event this lawn care machine were to ride into a ditch and the underside of the platform were to strike the edge or sloping areas of the ditch, and the said large plastic sheet tubing is of transparent or translucent material so the operator may view the contents of the plastic bag while it is being filled so as to avoid overfilling the bag and disabling this plastic sheet tubing bagging system.

19. The method of collecting grass cuttings and ground litter which are being carried in an airstream and discharged at high speed from a machine traveling over the ground, said method comprising:
  a. the steps of separating much of the airstream from the grass cuttings and ground litter and returning the airstream to the atmosphere; and
  b. providing a supply of large plastic sheet tubing that is folded into a compact annular cartridge, where the lower end of the tubing is first gathered together and sealed shut in the nature of a bag; and
  c. allowing the grass cuttings and ground litter to fall through the center of the annular cartridge and to fill the plastic bag thereby causing the plastic tubing to pay out from the cartridge as the bag begins to fill up and lower itself by gravity; and
  d. supporting the plastic bag on a suspended platform raised above the ground as the said machine travels over the ground;
  e. and in the area beneath the annular cartridge of plastic tubing creating by means of remote control a throttling action on the empty top portion of the plastic bag to collapse the bag into a closed rope-like formation at a critical time before the plastic bag becomes overfilled; and
  f. applying sealing means by remote control at two spaced locations along the length of the rope-like formation to insure that the plastic tubing is sealed shut at those locations; and
  g. severing the said rope-like formation by remote control in the area intermediate the two sealed locations so as to seal both the top of the lower plastic bag while sealing the bottom end of the next plastic bag to be filled by this method; and
  h. unloading the sealed plastic bag by remote control from the suspended supporting platform so this plastic bag-forming and filling method can be recycled.

20. The method of forming and filling plastic bags as recited in claim 19 wherein the said separated return airstream is directed away from the forward direction of travel of the said machine so as to provide the operator of this machine with a clean work environment.

21. The method of forming and filling plastic bags as recited in claim 20 wherein the flow of the said grass cuttings and ground litter is halted temporarily just prior to creating the throttling action so the said rope-like formation does not entrap the grass cuttings and ground litter.

22. The method of forming and filling plastic bags as recited in claim 20 wherein the filling operation of the plastic bag is halted before the top level of the grass cuttings in the bag reaches the location where the lower sealing operation takes place.

23. The method of forming and filling plastic bags as recited in claim 22 wherein the said supply of large plastic sheet tubing is of great length as compared to its diameter, and it is compressed lengthwise into a compact annular shape having a vertical height of a very small dimension.

24. The method of forming and filling plastic bags as recited in claim 23 wherein the said compact annular cartridge has restraining means for resisting the wholesale removal of the plastic sheet tubing from the cartridge as the plastic bag is being filled so the sheet tubing pays out only one length at a time.

25. The method of forming and filling plastic bags as recited in claim 24 wherein the method is practiced in a generally vertical array where the step of separating much of the airstream from the grass cuttings occurs mainly adjacent the top of the array, next followed by the provision of the supply of large plastic sheet tubing in the compact annular cartridge, next followed by the area for creating the throttling action on the plastic sheet tubing coupled with the application of the sealing means and, in turn, the severing of the rope-like formation, next followed by the large, generally open, bag-forming area where the plastic bag is filled, and lastly followed by the bag-supporting platform area as the lowermost formation of the vertical array.

* * * * *